United States Patent
Spendlove et al.

(10) Patent No.: US 12,146,781 B2
(45) Date of Patent: Nov. 19, 2024

(54) SYSTEM AND METHOD FOR REAL-TIME MATERIAL CARRYBACK DEDUCTION IN LOADING AND DUMPING WORK CYCLES

(71) Applicant: Deere & Company, Moline, IL (US)

(72) Inventors: Jonathan Spendlove, Bettendorf, IA (US); John M. Hageman, Dubuque, IA (US); Zimin W. Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 500 days.

(21) Appl. No.: 17/532,727

(22) Filed: Nov. 22, 2021

(65) Prior Publication Data

US 2022/0373384 A1   Nov. 24, 2022

Related U.S. Application Data

(60) Provisional application No. 63/190,933, filed on May 20, 2021.

(51) Int. Cl.
*G01G 19/08* (2006.01)
*E02F 9/26* (2006.01)
(Continued)

(52) U.S. Cl.
CPC .............. *G01G 19/08* (2013.01); *E02F 9/26* (2013.01); *G01F 15/068* (2013.01);
(Continued)

(58) Field of Classification Search
CPC ......... E02F 9/26; G01F 15/068; G01G 19/08; G01G 19/414; G01S 19/52; G07C 5/02
(Continued)

(56) References Cited

U.S. PATENT DOCUMENTS 4,230,196 A * 10/1980 Snead ...................... G01G 5/06
                                                  177/141
4,635,739 A *  1/1987 Foley ..................... G01G 19/10
                                                  177/208

(Continued)

FOREIGN PATENT DOCUMENTS

DE    102020206368 A1   11/2021
WO      2014166331 A1   10/2014
WO      2018021321 A1    2/2018

OTHER PUBLICATIONS

German Search Report issued in application No. 102022202953.4 dated Apr. 15, 2024, 12 pages.

*Primary Examiner* — Randy W Gibson
(74) *Attorney, Agent, or Firm* — Gary L. Montle; Lucian Wayne Beavers; Patterson Intellectual Property Law, PC

(57) ABSTRACT

A system and method are provided for real-time deduction of material carryback in a loading container of a transport vehicle, wherein the material is loaded in the loading container by a work machine at a first site and dumped from the loading container by the transport vehicle at a second site. A first sensor (e.g., a camera associated with the work machine) provides first data corresponding to a volume of material loaded in the loading container in a first work state (e.g., loaded). A second sensor (e.g., a camera or a payload measuring unit associated with the transport vehicle) provides second data corresponding to a volume of material loaded in the loading container in a second work state (e.g., unloaded). A generated output signal corresponds to a calculated total volume of material associated with a work cycle, said total volume based on at least the provided first and second data.

20 Claims, 4 Drawing Sheets

(51) Int. Cl.
*G01F 15/06* (2022.01)
*G01G 19/414* (2006.01)
*G01S 19/52* (2010.01)
*G07C 5/02* (2006.01)

(52) U.S. Cl.
CPC ............ *G01G 19/414* (2013.01); *G01S 19/52* (2013.01); *G07C 5/02* (2013.01)

(58) Field of Classification Search
USPC ............ 701/50; 702/173, 174; 177/136–141
See application file for complete search history.

(56) References Cited

U.S. PATENT DOCUMENTS

| | | | |
|---|---|---|---|
| 4,835,719 A * | 5/1989 | Sorrells | G01G 19/10 |
| | | | 701/1 |
| 4,921,578 A * | 5/1990 | Shiraishi | G01G 19/08 |
| | | | 177/136 |
| 5,646,844 A | 7/1997 | Gudat et al. | |
| 7,671,725 B2 | 3/2010 | Tsuji et al. | |
| 7,949,449 B2 | 5/2011 | Koch et al. | |
| 8,626,406 B2 | 1/2014 | Schleicher et al. | |
| 8,843,311 B2 | 9/2014 | Takeda | |
| 8,954,252 B1 | 2/2015 | Urmson et al. | |
| 9,221,659 B2 | 12/2015 | Fukasu et al. | |
| 9,415,953 B2 | 8/2016 | Bonefas | |
| 9,519,288 B2 | 12/2016 | Friend | |
| 9,567,731 B2 | 2/2017 | Darukhanavala et al. | |
| 9,712,791 B2 | 7/2017 | Kim et al. | |
| 9,908,385 B2 | 3/2018 | Chundrlik, Jr. et al. | |
| 9,946,451 B2 | 4/2018 | Kim et al. | |
| 10,234,368 B2 * | 3/2019 | Cherney | G01N 9/02 |
| 10,479,354 B2 | 11/2019 | Posselius et al. | |
| 10,489,738 B2 * | 11/2019 | Clark | G06Q 10/063112 |
| 10,662,613 B2 | 5/2020 | Ready-Campbell et al. | |
| 10,724,208 B2 * | 7/2020 | Gliniorz | E02F 9/26 |
| 10,801,177 B2 | 10/2020 | Ready-Campbell et al. | |
| 10,894,561 B2 | 1/2021 | Kaufmann et al. | |
| 10,968,602 B2 | 4/2021 | Hendricks | |
| 11,111,931 B2 | 9/2021 | Muraoka et al. | |
| 11,131,082 B2 * | 9/2021 | Sherlock | E02F 9/264 |
| 11,348,704 B2 * | 5/2022 | Furukawa | H01B 7/0009 |
| 2013/0046525 A1 | 2/2013 | Ali et al. | |
| 2015/0189216 A1 | 7/2015 | Fukuchi et al. | |
| 2015/0232125 A1 | 8/2015 | Kriel et al. | |
| 2016/0223350 A1 | 8/2016 | Lewis et al. | |
| 2016/0264032 A1 | 9/2016 | Terada et al. | |
| 2017/0037593 A1 | 2/2017 | Naik et al. | |
| 2017/0131722 A1 | 5/2017 | Hiramatsu et al. | |
| 2017/0135277 A1 | 5/2017 | Hiramatsu et al. | |
| 2018/0035050 A1 | 2/2018 | Lu et al. | |
| 2018/0106709 A1 * | 4/2018 | Cherney | B60P 1/00 |
| 2018/0179732 A1 | 6/2018 | Bartsch et al. | |
| 2018/0210454 A1 | 7/2018 | Ready-Campbell et al. | |
| 2020/0238881 A1 | 7/2020 | Hendricks | |

* cited by examiner

SYSTEM AND METHOD FOR REAL-TIME MATERIAL CARRYBACK DEDUCTION IN LOADING AND DUMPING WORK CYCLES

FIELD OF THE DISCLOSURE

The present disclosure relates generally to work cycles including work machines for material loading and transport vehicles for carrying and dumping the loaded material, and more particularly to systems and methods for real-time carryback deduction with respect to the loaded material.

BACKGROUND

Work machines as discussed herein may particularly refer to excavator machines for illustrative purposes, but may also for example include various other machines and equipment, self-propelled or otherwise, which modify the terrain or equivalent working environment in some way, and further are responsible for loading material from the proximate terrain into transport vehicles for delivery to a separate dumping site. Tracked or wheeled ground engaging units support an undercarriage from the ground surface, and the undercarriage may typically further support one or more work attachments (also or otherwise referred to as work implements) which are used to dig or otherwise extract material from the terrain and to selectively discharge the material into a loading area associated with the transport vehicles, such as for example the container of an articulated dump truck.

As used herein, the term "carryback material" may refer to material which undesirably remains in the loading container of the transport vehicle after the dumping process. This may occur for any number of reasons including for example wet conditions, an inherent property of the material being transported, a configuration of the loading container, a grade of the dumping site, or the like. The presence of material carryback is undesirable at least because of the added inefficiencies in the work cycle, but also because it adds uncertainty in the estimation of the volume of material loaded and transported during the work cycle. While payload weight can be more precisely measured for each load, volume is more important to the end users, and conventional methods for estimating volume from measured payload weight are relatively imprecise. Accordingly, it may typically be necessary to wait until all of the material has been spread at a destination site, and then conduct measurements with a drone.

It would therefore be desirable to provide an easy and effective way to measure and accordingly deduct the amount of carryback material in a given load. Unfortunately, cameras or equivalent imaging devices on a transport vehicle such as an articulated dump truck are unable to scan or otherwise measure the contents of a loading container when it is filled with material. In addition, cameras or equivalent imaging devices mounted on the work machine such as an excavator in many applications will be unable to scan or otherwise measure material on the bottom of the loading container.

BRIEF SUMMARY

The current disclosure provides an enhancement to conventional systems, at least in part by introducing a novel system and method for utilizing multiple image data sources mounted on multiple machines or vehicles in the work cycle and coordinated data processing for carryback deduction.

In one embodiment, a method as disclosed herein is provided for real-time deduction of material carryback in a loading container of a transport vehicle, wherein the material is loaded in the loading container by a work machine at a first site and dumped from the loading container by the transport vehicle at a second site. A first sensor is associated with one of the work machine or the transport vehicle and provides first data corresponding to a volume of material loaded in the loading container in a first work state. A second sensor is associated with the other of the work machine or the transport vehicle, and provides second data corresponding to a volume of material loaded in the loading container in a second work state. An output signal may be further generated corresponding to a calculated total volume of material associated with a work cycle, with the total volume being calculated based at least in part on the provided first data and the provided second data.

In one exemplary aspect according to the above-referenced embodiment, the generated output signal is provided to populate a data structure with the calculated total volume of material in association with at least one of the first site and the second site.

In another exemplary aspect according to the above-referenced embodiment, a first volume may be determined based at least in part on the provided first data and information regarding one or more dimensions of the loading container, a second volume may be determined based at least in part on the provided second data and the information regarding one or more dimensions of the loading container, and the total volume of material associated with the work cycle is calculated based on a difference between the determined first and second volumes.

In another exemplary aspect according to the above-referenced embodiment, the information regarding one or more dimensions of the loading container may be stored in association with the transport vehicle, wherein the first sensor is associated with the work machine, the first data is transmitted from the work machine to the transport vehicle, and the first volume is calculated based on the transmitted first data and the stored information regarding one or more dimensions of the loading container.

In another exemplary aspect according to the above-referenced embodiment, the first sensor may comprise a first image data source configured to generate signals corresponding to a first profile of material loaded in the loading container in the first work state, the second sensor may comprise a second image data source configured to generate signals corresponding to a second profile of material loaded in the loading container in the second work state, and the total volume is calculated based at least in part on a determined first profile and a determined second profile of loaded material.

In another exemplary aspect according to the above-referenced embodiment, the information regarding one or more dimensions of the loading container is obtained via scanned images from the first image data source and/or the second image data source.

In another exemplary aspect according to the above-referenced embodiment, the information regarding one or more dimensions of the loading container is retrieved from data storage based upon scanned images comprising an identifier associated with the transport vehicle.

In another exemplary aspect according to the above-referenced embodiment, the information regarding one or more dimensions of the loading container is retrieved from data storage based upon communications between the work machine and the transport vehicle and comprising an identifier associated with the transport vehicle.

In another exemplary aspect according to the above-referenced embodiment, the first sensor may comprise an image data source associated with the work machine and configured to generate signals corresponding to a profile of material loaded in the loading container in the first work state, and the second sensor may comprise a payload measuring unit associated with the transport vehicle.

In another exemplary aspect according to the above-referenced embodiment, a material density of material loaded in the transport vehicle may be determined based on input from the first sensor in the first work state and on input from the payload measuring unit in the first work state. A volume of material remaining in the transport vehicle in the second work state may be determined based on input from the payload measuring unit in the second work state and further in view of the determined material density. The information regarding one or more dimensions of the loading container may be obtained via scanned images from the image data source. The information regarding one or more dimensions of the loading container may be retrieved from data storage based upon scanned images comprising an identifier associated with the transport vehicle, and/or based upon communications between the work machine and the transport vehicle and comprising an identifier associated with the transport vehicle.

In another embodiment, a system is disclosed herein for real-time deduction of material carryback in a loading container of a transport vehicle, wherein the material is loaded in the loading container by a work machine at a first site and dumped from the loading container by the transport vehicle at a second site. The system includes a first sensor associated with one of the work machine or the transport vehicle and configured to provide first data corresponding to a volume of material loaded in the loading container in a first work state, and a second sensor associated with the other of the work machine or the transport vehicle and configured to provide second data corresponding to a volume of material loaded in the loading container in a second work state. A computing device includes a computer-readable medium residing on one of the work machine or the transport vehicle and having program instructions residing thereon, said program instructions executable by a processor to direct the performance of steps in a method according to the above-referenced embodiment and optionally any of the exemplary aspects associated therewith.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-7, various embodiments may now be described of an inventive system and method.

Figure 1:
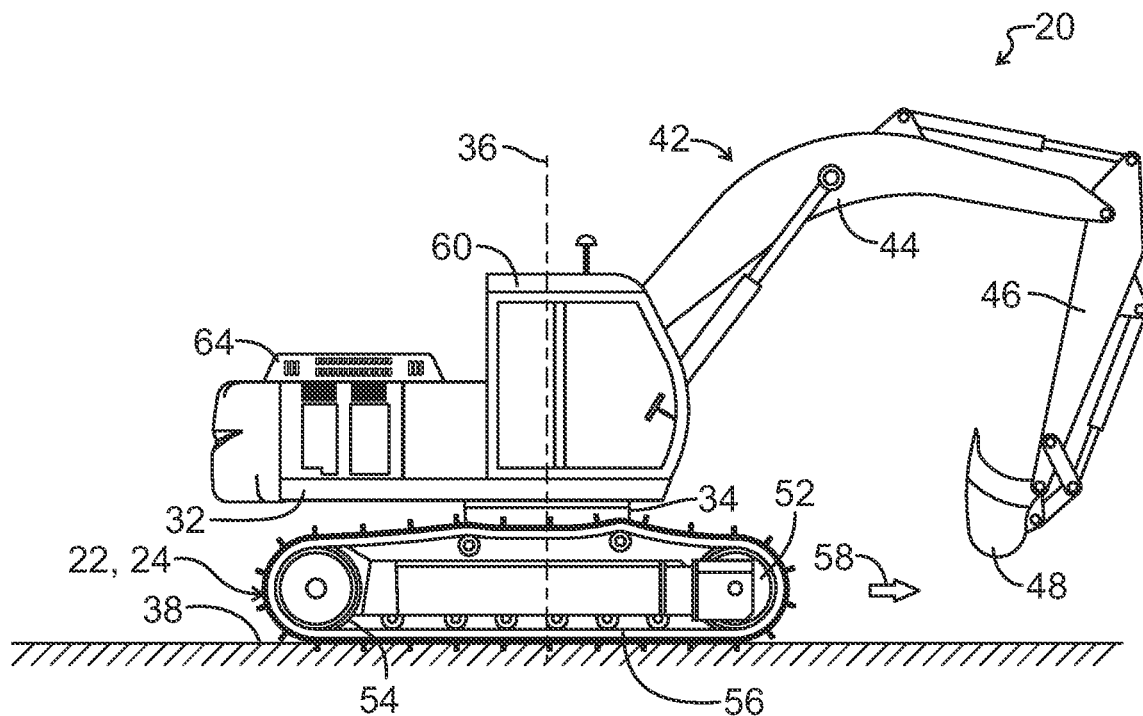
FIG. 1 is a perspective view representing an exemplary work machine according to the present disclosure.

FIG. 1 in a particular embodiment as disclosed herein shows a representative work machine 20 in the form of, for example, a tracked excavator machine. The work machine 20 includes an undercarriage 22 with first and second ground engaging units 24 driven by first and second travel motors (not shown), respectively.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

A work implement 42 in the context of the referenced work machine 20 includes a boom assembly with a boom 44, an arm 46 pivotally connected to the boom 44, and a working tool 48. The term "implement" may be used herein to describe the boom assembly (or equivalent thereof) collectively, or individual elements of the boom assembly or equivalent thereof. The boom 44 is pivotally attached to the main frame 32 to pivot about a generally horizontal axis relative to the main frame 32. The working tool in this embodiment is an excavator shovel (or bucket) 48 which is pivotally connected to the arm 46. The boom assembly extends from the main frame 32 along a working direction of the boom assembly. The working direction can also be described as a working direction of the boom 44. As described herein, control of the work implement 42 may relate to control of any one or more of the associated components (e.g., boom 44, arm 46, tool 48).

It is within the scope of the present disclosure that the work machine 20 may take various alternative forms and further utilize alternative work implements 42 to modify the proximate terrain.

In the embodiment of FIG. 1, the first and second ground engaging units 24 are tracked ground engaging units, although various alternative embodiments of a work machine 20 are contemplated wherein the ground engaging units 24 may be wheeled ground engaging units. Each of the tracked ground engaging units 24 includes an idler 52, a drive sprocket 54, and a track chain 56 extending around the idler 52 and the drive sprocket 54. The travel motor of each tracked ground engaging unit 24 drives its respective drive sprocket 54. Each tracked ground engaging unit 24 is represented as having a forward traveling direction 58 defined from the drive sprocket 54 toward the idler 52. The forward traveling direction 58 of the tracked ground engaging units 24 also defines a forward traveling direction 58 of the undercarriage 22 and thus of the work machine 20. In some applications, including uphill travel as further discussed below, the orientation of the undercarriage 22 may be reversed such that a traveling direction of the work machine 20 is defined from the idler 52 toward its respective drive sprocket 54, whereas the work implement(s) 42 is still positioned ahead of the undercarriage 22 in the traveling direction.

Although an excavator as the work machine 20 may be self-propelled in accordance with the above-referenced elements, other forms of work machines 20 may be contemplated within the scope of the present disclosure that are not self-propelled, unless otherwise specifically noted.

An operator's cab 60 may be located on the main frame 32. The operator's cab 60 and the work implement 42 (e.g., boom assembly) may both be mounted on the main frame 32 so that the operator's cab 60 faces in the working direction 58 of the boom assembly. A control station (not shown) may be located in the operator's cab 60. The control station may include or otherwise be associated with a user interface as further described below. As used herein, directions with regard to work machine 20 may be referred to from the perspective of an operator seated within the operator cab 60; the left of the work machine is to the left of such an operator, the right of the work machine is to the right of such an operator, a front-end portion (or fore) of the work machine is the direction such an operator faces, a rear-end portion (or aft) of the work machine is behind such an operator, a top of the work machine is above such an operator, and a bottom of the work machine below such an operator.

Also mounted on the main frame 32 is an engine 64 for powering the work machine 20. The engine 64 may be a diesel internal combustion engine, but is not so limited and within the scope of the present disclosure the work machine 20 may alternatively be driven by a non-combustion power source (not shown). The engine 64 may drive a hydraulic pump to provide hydraulic power to the various operating systems of the work machine 20.

Figure 2:
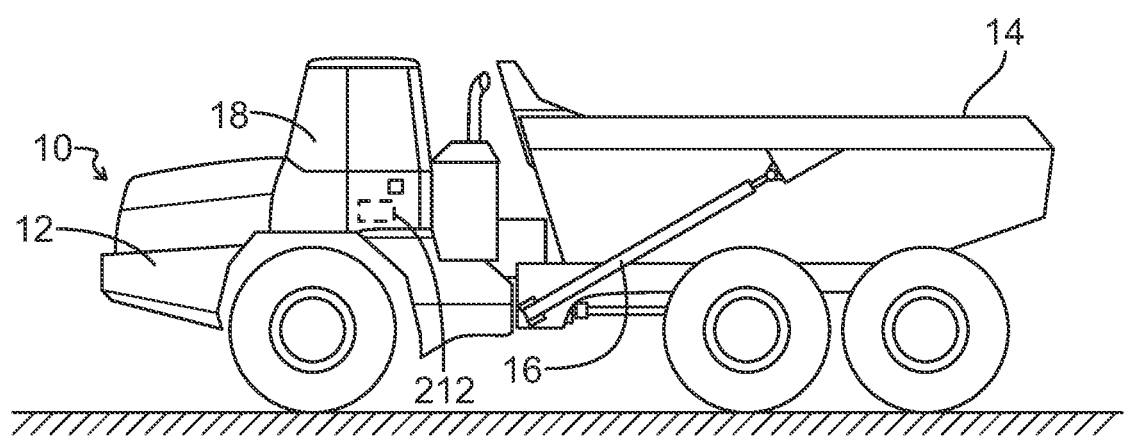
FIG. 2 is a perspective view representing an exemplary transport vehicle according to the present disclosure.

An articulated dump truck as representing a transport vehicle 10 in FIG. 2 may include a plurality of wheels and associated axles, and a frame 12 supporting a loading container 14 (e.g., truck bed) having for example a loading surface at the bottom of an interior area surrounded by sidewalls, and a top edge at least part of which may typically be in parallel with the ground surface. A hydraulic piston-cylinder unit 16 may be coupled between the frame 12 and the loading container 14 and configured to selectively extend and raise/pivot the loading container 14 rearward to a dumping position, and to retract and lower/pivot the loading container forward from the dumping position to a travel and loading position (as shown). An operator's cab 18 of the transport vehicle 10 may be located on the frame 12, wherein directions with regard to the transport vehicle 10 may be referred to from the perspective of an operator seated within the operator cab 18; the left of the transport vehicle is to the left of such an operator, the right of the transport vehicle is to the right of such an operator, a front-end portion (or fore) of the transport vehicle is the direction such an operator faces, a rear-end portion (or aft) of the transport vehicle is behind such an operator, a top of the transport vehicle is above such an operator, and a bottom of the transport vehicle below such an operator.

A controller 212 for the transport vehicle 10 may in some embodiments comprise or otherwise be associated with an operator interface in the operator's cab 18, as further described below.

Figure 3:
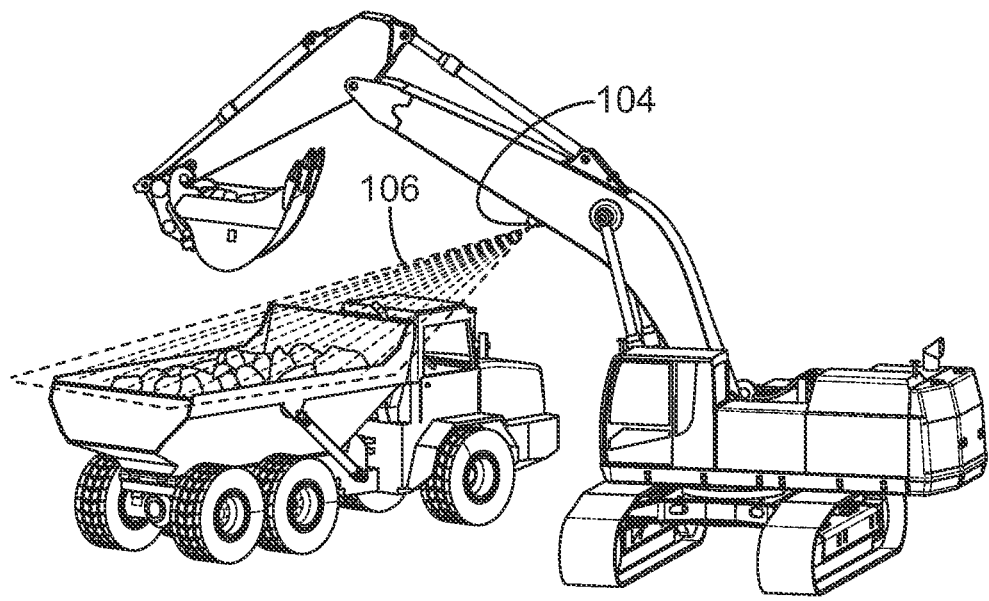
FIG. 3 is a perspective view representing an image data source located on the work machine of FIG. 1, scanning a profile of material loaded on the transport vehicle of FIG. 2 in a first work state.

Referring next to FIG. 3, an image data source 104 (not shown in FIG. 1) may be mounted on the work machine 20 in accordance with the present disclosure. The location of the image data source 104 may be chosen such that a field of view 106 encompasses the loading container 14 of the transport vehicle 10 during at least a portion of a material loading operation as a first work state wherein the surface of the loading container is retracted into a substantially horizontal orientation as shown, and may preferably be chosen such that the field of view 106 encompasses all four top edges of the loading container 14. As represented in FIG. 3, the work machine 20 is on the same level relative to the transport vehicle 10, but it may be appreciated that in various loading applications the work machine 20 may be in an elevated position relative to the transport vehicle 10 and/or at various respective orientations relative to each other. In some embodiments, a plurality of image data sources 104 or an image data source 104 that is moveable or reconfigurable in position may be provided to account for the differences in potential relative elevations, positions, and orientations with respect to a transport vehicle during loading.

Figure 4:
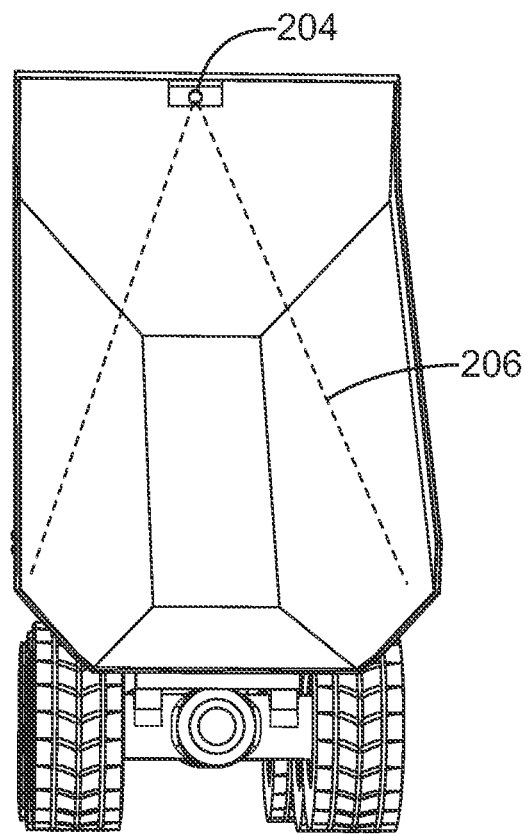
FIG. 4 is a perspective view representing an image data source located on the transport vehicle of FIG. 2, scanning a profile of material remaining in the loading container in a second work state.

Referring to FIG. 4, another image data source 204 (not shown in FIG. 2) may be mounted on the transport vehicle 10 in accordance with the present disclosure. The location of the image data source 204 may be chosen such that a field of view 206 encompasses the loading container 14 of the transport vehicle 10 upon at least completion of a material dumping operation as a second work state wherein the surface of the loading container is pivoted into an angled orientation as shown, and may preferably be chosen such that the field of view 206 fully encompasses a bottom surface of the loading container 14.

Figure 5:
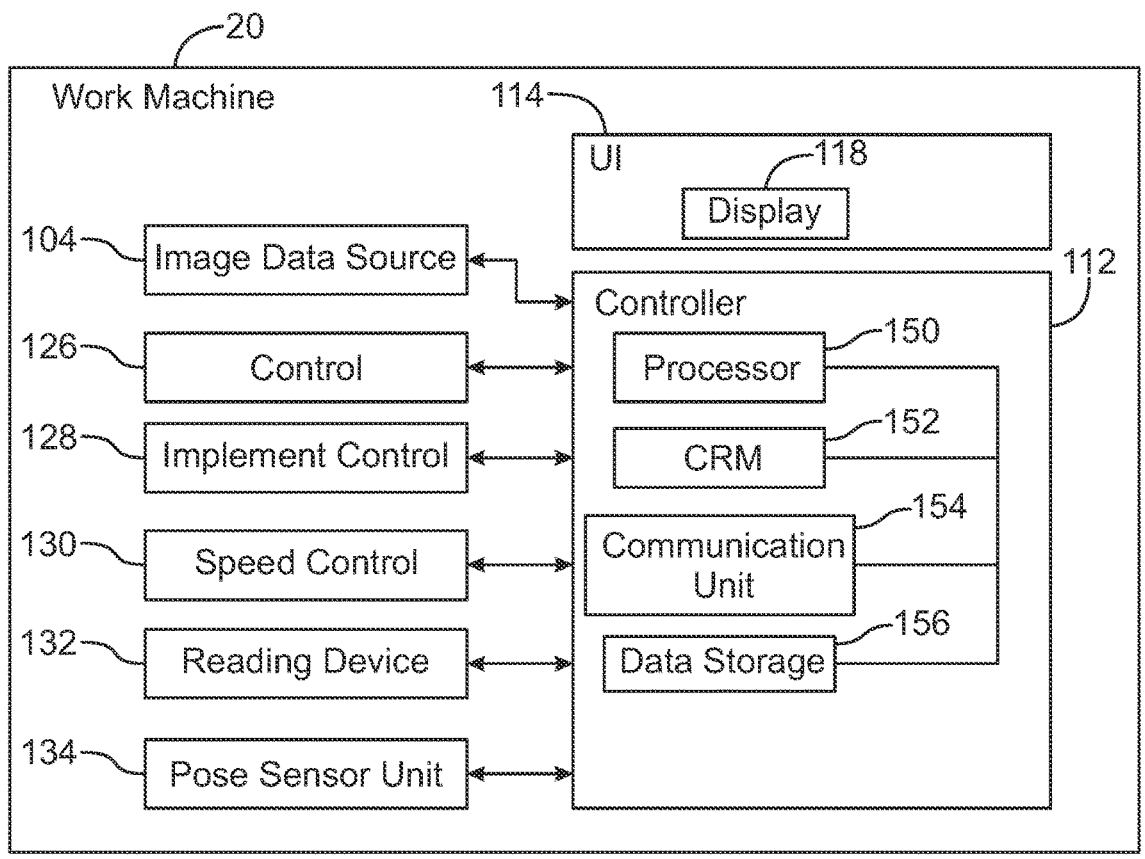
FIG. 5 is a block diagram representing a control system for the work machine according to an embodiment of the present disclosure.

As schematically illustrated in FIG. 5, the work machine 20 includes a control system including a controller 112. The controller 112 may be part of the machine control system of the work machine 20, or it may be a separate control module.

As referenced above, the controller 112 is configured to receive input signals from some or all of various image data sources 104 such as cameras and collectively defining an imaging system. The image data sources 104 may include video cameras configured to record an original image stream and transmit corresponding data to the controller 112. In the alternative or in addition, the image data sources 104 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as image data sources within the scope of the present disclosure. The number and orientation of said image data sources 104 may vary in accordance with the type of work machine 20 and relevant applications, but may at least be provided with respect to an area in a travelling direction of the work machine 20 and configured to capture image data associated with a loading area proximate the work machine 20 such as for example corresponding to loading container 14.

The position and size of an image region recorded by a respective camera as an image data source 104 may depend on the arrangement and orientation of the camera and the camera lens system, in particular the focal length of the lens of the camera, but may desirably be configured to capture substantially the entire loading container 14 throughout a loading operation. One of skill in the art may further appreciate that image data processing functions may be performed discretely at a given image data source if properly configured, but also or otherwise may generally include at least some image data processing by the controller or other downstream data processor. For example, image data from any one or more image data sources may be provided for three-dimensional point cloud generation, image segmentation, object delineation and classification, and the like, using image data processing tools as are known in the art in combination with the objectives disclosed.

The controller 112 of the work machine 20 may be configured to produce outputs, as further described below, to a user interface 114 associated with a display unit 118 for display to the human operator. The controller 112 may be configured to receive inputs from the user interface 114, such as user input provided via the user interface 114. Not specifically represented in FIG. 5, the controller 112 of the work machine 20 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work machines 20 may be further coordinated or otherwise interact with a remote server or other computing device for the performance of operations in a system as disclosed herein.

The controller 112 may in various embodiments be configured to generate control signals for controlling the operation of respective actuators, or signals for indirect control via intermediate control units, associated with a machine steering control system 126, a machine implement control system 128, and an engine speed control system 130. The control systems 126, 128, 130 may be independent or otherwise integrated together or as part of a machine control unit in various manners as known in the art. The controller 112 may for example generate control signals for controlling the operation of various actuators, such as hydraulic motors or hydraulic piston-cylinder units (not shown), and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

A reading device 132 as conventionally known in the art such as for example an RFID device, barcode scanner, or the like may further be provided and communicatively linked to the controller 112 for obtaining readable information associated with a particular transport vehicle 10.

A pose sensor unit 134 may further be linked to the controller 112 for capturing and processing data associated with for example a current or predicted pose of the loading container 14 of a transport vehicle 10. The pose sensor unit 134 in certain embodiments may be integrated or otherwise associated with the image data source(s) 104, for example where images of the loading container are captured and processed to associate a current pose with a respective work state. The pose sensor unit 134 in certain embodiments may be integrated or otherwise associated with a reading device 132, for example where data is captured or otherwise received from the transport vehicle in association with a current loading container pose and further with a respective work state.

The controller 112 includes or may be associated with a processor 150, a computer readable medium 152, a communication unit 154, and data storage 156 such as for example a database network. It is understood that the controller 112 described herein may be a single controller having some or all of the described functionality, or it may include multiple controllers wherein some or all of the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 152. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external communications units, systems, or devices, and/or support or provide communication interface with respect to internal components of the work machine 20. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, electronic memory, and optical or other storage media, as well as in certain embodiments one or more databases residing thereon.

Figure 6:
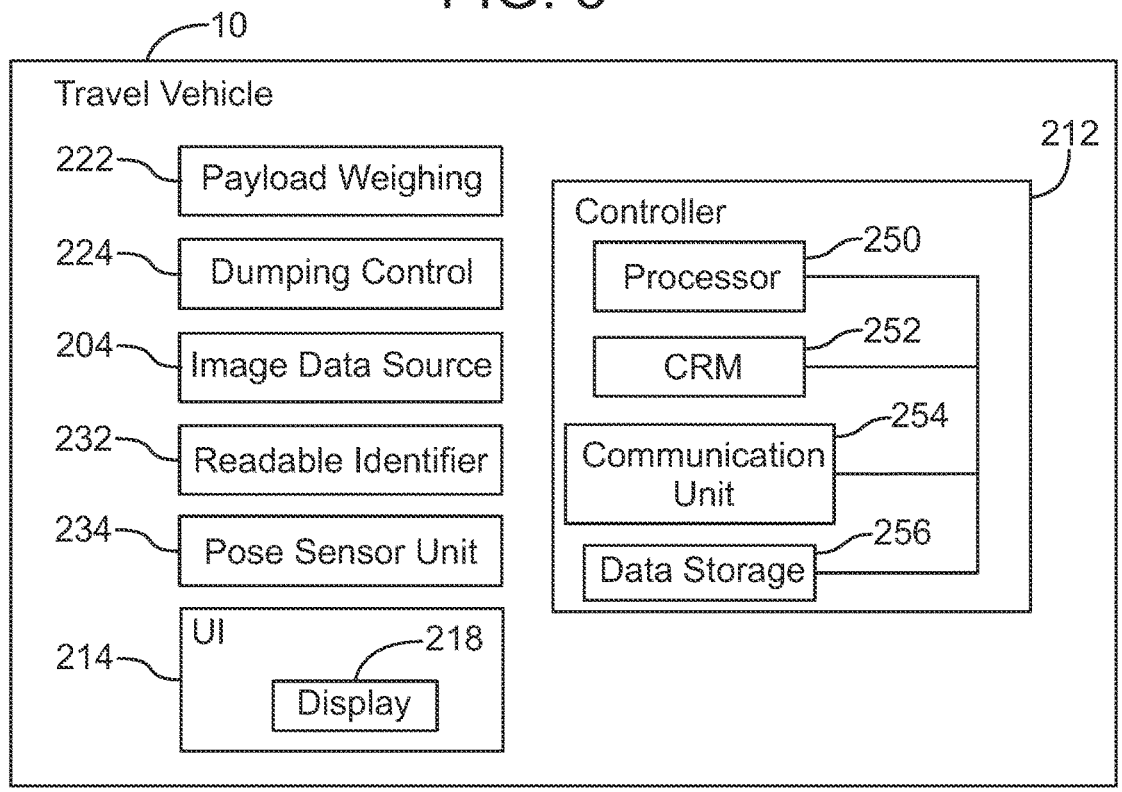
FIG. 6 is a block diagram representing a control system for the transport vehicle according to an embodiment of the present disclosure.

As schematically illustrated in FIG. 6, in embodiments of a system as disclosed herein the plurality of transport vehicles 10 may each include a respective control system including a controller 212. The controller 212 may be part of a vehicle control system of the transport vehicle 10, or it may be a separate control module.

The controller 212 of a respective transport vehicle 10 may be configured to receive input signals from a payload measuring unit 222 as is conventionally known in the art for certain articulated dump trucks. The controller 212 may further integrate or otherwise communicate with a dumping control system 224 to selectively direct the operation of the hydraulic piston-cylinder unit 16 for articulating the loading container 14 between a loading position and a dumping position. The transport vehicle 10 may further comprise a barcode 332 or otherwise generate another form of machine-readable identifier 232 such as for example an RFID signal via a transceiver for communicating readable information to a work machine 20 or the like.

A pose sensor unit 234 may further be linked to the controller 212 for capturing and processing data associated with for example a current or predicted pose of the loading container 14 of the transport vehicle 10. The pose sensor unit 234 in certain embodiments may be integrated or otherwise associated with the image data source(s) 204, for example where images of the loading container are captured and processed to associate a current pose with a respective work state. The pose sensor unit 234 in certain embodiments may be integrated or otherwise associated with a machine control system or with a user interface 214, for example to receive inputs corresponding to a commanded position of the loading container or output signals for controlling the pose of the loading container via the dumping control system 224.

In certain embodiments, the controller 212 may further integrate or otherwise communicate with image data sources 204 such as vehicle-mounted cameras or the like, as described above.

The controller 212 of a respective transport vehicle 10 may be configured to produce outputs, as further described below, to the user interface 214 associated with a display unit 218 for display to the human operator. The controller 212 may be configured to receive inputs from the user interface 214, such as user input provided via the user interface 214.

The controller 212 of a respective transport vehicle 10 may further include or be associated with a processor 250, a computer readable medium 252, a communication unit 254, and data storage 256 such as for example a database network. It is understood that the controller 212 described herein may be a single controller having some or all of the described functionality, or it may include multiple controllers wherein some or all of the described functionality is distributed among the multiple controllers.

Figure 7:
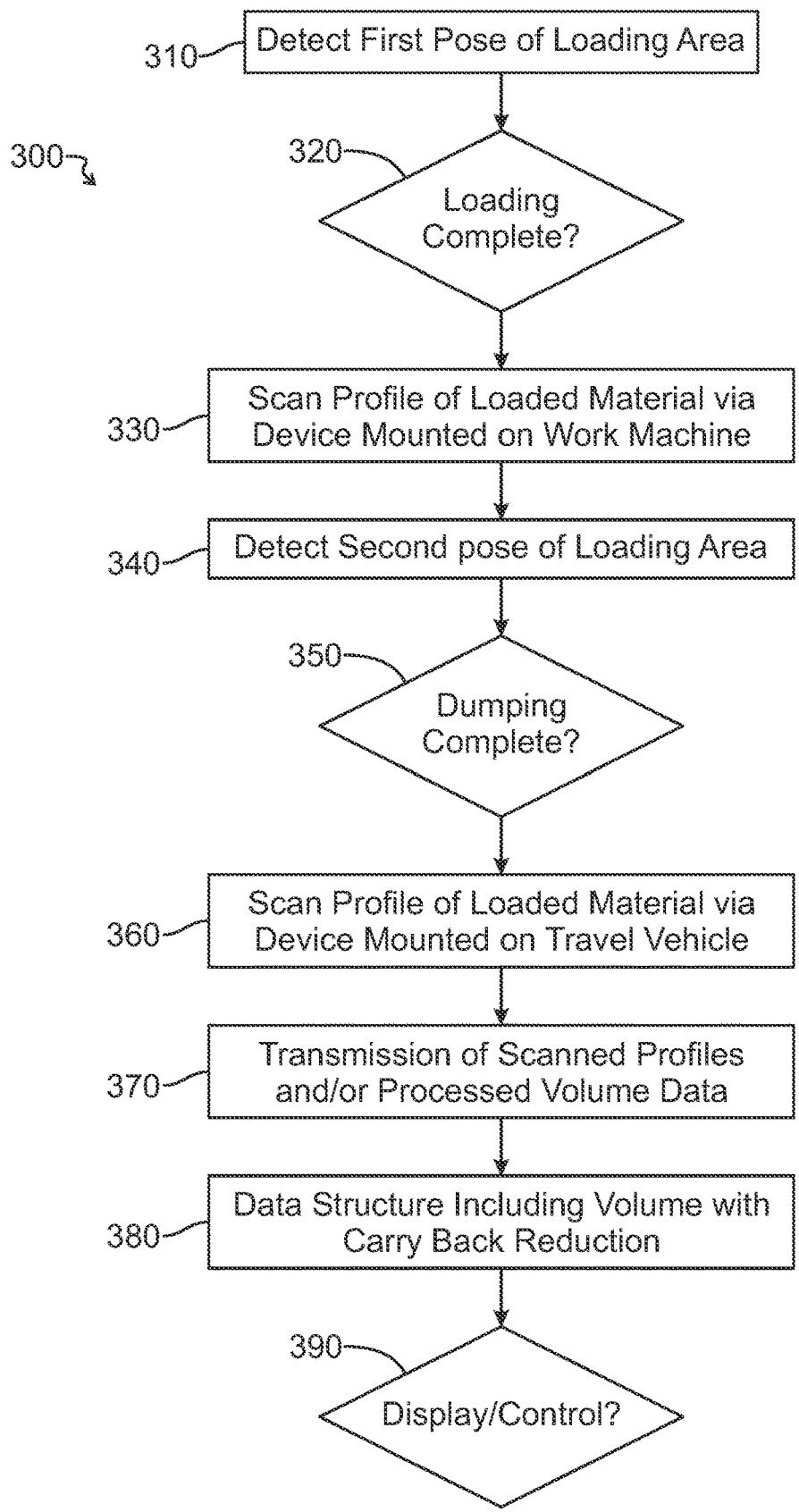
FIG. 7 is a flowchart representing an exemplary method according to an embodiment of the present disclosure.

Referring next to FIG. 7, with further illustrative reference back to FIGS. 1-6, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers or machine control systems, remote servers, mobile user devices, and the like.

A first step 310 may include detecting a first pose of the loading area/loading container 14 for a transport vehicle 10, for example in association with a first work state such as a loading stage. In the context of an excavator as the work machine 20 loading material into a loading container of an articulated dump truck as the transport vehicle 10, the first work state may be associated with a loading container pose wherein the loading container is fully retracted for receiving material and optionally further wherein the transport vehicle is appropriately positioned with respect to the frame 12 of the work machine 20. An image data source 104 may be mounted on the work machine, for example on an underside of the work implement 42 but not expressly limited thereto, such that images may be sufficiently captured for processing the upper edges of the loading container and determining for example the orientation of the loading container with respect to the ground surface.

When the loading process is determined to be complete (i.e., "yes" in response to query of step 320), for example via a manual user input or other form of input signal or processed image data, the method may continue in step 330 by scanning a profile of the loaded material in the loading container via the image data source(s) 104 mounted on the work machine 20. As previously noted, an image data source 204 mounted on the transport vehicle 10 will typically be unable to capture the profile of material because the material is loaded high enough relative to the contours of the loading container to block the respective field of view 206.

As previously noted, the profile may be scanned and further analyzed using for example three-dimensional point cloud generation, image segmentation, object delineation and classification, and the like, using image data processing tools as are known in the art, further optionally in view of a reference profile corresponding to predetermined contours of the loading container 14, so as to for example estimate a volume of the material loaded in the container based on the scanned profile. Certain dimensions such as information generally corresponding to relevant contours of the loading container 14 may be determined dynamically using the image data source, or a reference profile may be predetermined and retrieved from data storage upon identifying the particular transport vehicle 10 or type of transport vehicle, or may be input directly from the user interface, etc. For example, information regarding one or more dimensions of the loading container 14 may be stored in association with the transport vehicle 10, wherein the detected first profile is associated with the work machine 20 and is transmitted from the work machine to the transport vehicle 10, and the first volume is calculated based on the transmitted detected first profile and the stored information regarding one or more dimensions of the loading container 14.

In an embodiment, raw data corresponding to the scanned profile may be captured by the image data source 104 on the work machine 20 and then transmitted to the transport vehicle 10, which has no need to obtain reference profile data corresponding to dimensions such as for example relating to the contours of the loading container 14 from another location and accordingly can make volume estimations without such a sub-step. In certain embodiments, a model may be implemented which estimates the volume of material directly from the scanned profile without supplemental reference to the contours of the loading container 14 or other parameters. Such a model may be developed and implemented in the form of a look-up table based on defined levels of the material relative to one or more identified contours/edges of the loading container 14, or may be incrementally refined over time using machine learning techniques, or the like.

A next step 340 may include detecting a second pose of the loading area/loading container 14 for the transport vehicle 10, for example in association with a second work state such as a dumping stage. In the above-referenced context of an articulated dump truck as the transport vehicle 10, the second work state may be associated with a loading container pose wherein the piston-cylinder unit 16 coupled to the loading container 14 is substantially fully extended for dumping material out of the loading container 14. In an embodiment, a signal may be generated to indicate that the loading container 14 is pivoted to the second pose, such as for example from a sensor associated with the piston-cylinder unit 16 or a manual input from a user interface. The second pose may be determined from the processing of images from the image data source 204.

When the dumping process is determined to be complete (i.e., "yes" in response to query of step 350), for example via a manual user input or other form of input signal or processed image data, the method may continue in step 360 by scanning a profile of any remaining material in the loading container 14 after dumping. The scanned profile may be generated via the image data source 204 which may for example be mounted above a plane corresponding to an upper edge of the loading container 14, and configured such that images may be sufficiently captured for processing at least a bottom surface of the loading container 14. As previously noted, an image data source 104 mounted on the work machine 20 may be unable to reliably capture the profile of material remaining in the otherwise empty loading container 14 because the respective field of view 106 typically does not extend to the bottom surface of the loading container 14.

The profile of remaining (carryback) material in the second work state may for example be scanned and further analyzed in similar fashion as with the profile of loaded material in the first work state, but the processing techniques are not necessarily the same and may be performed in different locations in certain embodiments.

The next step 370 as represented in FIG. 7 may include transmission of the scanned profiles and/or processed volume data from an initial location to a downstream location for additional processing and to support further functions such as reporting, displaying, control, or the like.

For example, and as initially referenced above, in an embodiment raw data from an initial scan of loaded material in the loading container 14 as captured by an image data source mounted on the work machine 20 may be transmitted to the transport vehicle 10. The scan data may be provided in an input data string along with an identifier for the work machine, an identifier for the loading site, and/or the like, such that such first scan data may be supplemented with additional scan data after the loading container 14 has been substantially emptied and computations performed against the respective scans to determine a total volume dumped in the current iteration of a work cycle. Generally stated, if the second scan yields no carryback material in the loading container 14, then all of the material loaded in the loading container 14 at the time of the first scan, or in other words everything that has been dumped on the ground prior to the time of the second scan, may be treated as positive yardage. Alternatively, if the second scan yields a profile corresponding to a certain amount of carryback material in the loading material 14, a volume of material dumped on the ground prior to the time of the second scan may be calculated/estimated based on a comparison of the respective scans further optionally in view of supporting parameters such as the contours of the loading container 14.

In an embodiment, a material density may be determined based at least on a first input (e.g., from the payload measuring unit) taken before material is loaded in the transport vehicle 10, a second input (e.g., from an image data source 104 on the work machine 20) after the material is loaded in the transport vehicle 10, and further on a third input (e.g., from the payload measuring unit) taken alongside the second input but compared with the first and second inputs to determine the actual loaded volume and weight of the material added since the first input. After the material corresponding to the third input has been discharged from the loading container, a volume of material remaining (e.g., carryback material) in the transport vehicle 10 may be determined based on a fourth input (e.g., from the payload measuring unit) and further in view of the previously determined material density.

In various embodiments, different data processing steps as disclosed herein may be performed in any of various possible stations. For example, the controller 212 for the transport vehicle 10 may be configured to receive data from the image data source 104 of the work machine 20 and perform data processing and volume estimation steps based on supplemental data from the image data source 204 of the transport vehicle 10. As another example, the respective controllers 112, 212 may individually perform image data processing steps to calculate/estimate volumes of the loaded material and the carryback material, respectively, wherein the volume data may be transmitted to a destination including either of the controllers 112, 212, an associated user interface, or a third-party device/system.

In an embodiment, a data structure such as for example a customized database may be developed and stored in association with for example such a third-party system, which is configured to receive scan data and/or volume data from either or both of the work machine 20 and the transport vehicle 10 (step 380). The data structure may be populated with such data and/or calculations based thereon and/or derivatives thereof to provide a total volume of material removed from a site associated with the work machine 20, a total volume of material removed from a site associated with the dumping state of the transport vehicle 10, or other aggregated values for example associated with a plurality of work machines 20 and/or transport vehicles 10 in a collective work site. Data received at a third-party system such as for example a central server, mobile user device, or the like may further include identifiers associated with the respective site, the transmitting work machine 20 or transport vehicle 10, the user, the time/date, and the like as part of a data string for appropriately populating the data structure or feeding into a program engine for generating the data entering the data structure.

In view of the previous steps and variations thereof, the method 300 may further include a step 390 for displaying relevant information to users and/or selectively executing control functions based thereon. For example, an operator of the transport vehicle 10 may be informed in real-time of a volume of material remaining in the loading container 14 after dumping, or a volume of material currently loaded in the loading container 14. An automated control function may generate an alert when a determined volume of material in the loading container 14 during a loading work state exceeds a threshold value, or when a remaining volume of material in the loading container 14 at the end of a dumping work state exceeds a threshold value. In an embodiment, an automated control function may repeat one or more aspects of a dumping work state if the remaining volume of material in the loading container 14 at the end of a dumping work state exceeds the threshold value.

In view of the above-referenced embodiments and equivalents thereof as may be appreciated by one of skill in the art, a more accurate and timely estimation of material volume at each work stage leads to more accurate productivity and efficiency calculations.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for real-time deduction of material carryback in a loading container of a transport vehicle, wherein the material is loaded in the loading container by a work machine at a first site and dumped from the loading container by the transport vehicle at a second site, the method comprising:
   providing, via a first sensor associated with one of the work machine or the transport vehicle, first data corresponding to a volume of material loaded in the loading container in a first work state;
   providing, via a second sensor associated with the other of the work machine or the transport vehicle, second data corresponding to a volume of material loaded in the loading container in a second work state; and
   generating an output signal corresponding to a calculated total volume of material associated with a work cycle, said total volume based at least in part on the provided first data and the provided second data.

2. The method of claim 1, wherein the generated output signal is provided to populate a data structure with the calculated total volume of material in association with at least one of the first site and the second site.

3. The method of claim 1, comprising:
   determining a first volume based at least in part on the provided first data and information regarding one or more dimensions of the loading container;
   determining a second volume based at least in part on the provided second data and the information regarding one or more dimensions of the loading container; and
   calculating the total volume of material associated with the work cycle based on a difference between the determined first and second volumes.

4. The method of claim 3, wherein:
   the information regarding one or more dimensions of the loading container is stored in association with the transport vehicle,
   the first sensor is associated with the work machine and the first data is transmitted from the work machine to the transport vehicle, and
   the first volume is calculated based on the transmitted first data and the stored information regarding one or more dimensions of the loading container.

5. The method of claim 3, wherein:
   the first sensor comprises a first image data source configured to generate signals corresponding to a first profile of material loaded in the loading container in the first work state;
   the second sensor comprises a second image data source configured to generate signals corresponding to a second profile of material loaded in the loading container in the second work state; and
   the total volume is calculated based at least in part on a determined first profile and a determined second profile of loaded material.

6. The method of claim 5, wherein the information regarding one or more dimensions of the loading container is obtained via scanned images from the first image data source and/or the second image data source.

7. The method of claim 5, wherein the information regarding one or more dimensions of the loading container is retrieved from data storage based upon scanned images comprising an identifier associated with the transport vehicle.

8. The method of claim 5, wherein the information regarding one or more dimensions of the loading container is retrieved from data storage based upon communications between the work machine and the transport vehicle and comprising an identifier associated with the transport vehicle.

9. The method of claim 3, wherein:
   the first sensor comprises an image data source associated with the work machine and configured to generate signals corresponding to a profile of material loaded in the loading container in the first work state; and
   the second sensor comprises a payload measuring unit associated with the transport vehicle.

10. The method of claim 9, further comprising:
    determining a material density of material loaded in the transport vehicle based on input from the first sensor in the first work state and on input from the payload measuring unit in the first work state.

11. The method of claim 10, further comprising:
    determining a volume of material remaining in the transport vehicle in the second work state based on input from the payload measuring unit in the second work state and further in view of the determined material density.

12. The method of claim 11, wherein the information regarding one or more dimensions of the loading container is obtained via scanned images from the image data source.

13. The method of claim 11, wherein the information regarding one or more dimensions of the loading container is retrieved from data storage based upon scanned images comprising an identifier associated with the transport vehicle.

14. The method of claim 11, wherein the information regarding one or more dimensions of the loading container is retrieved from data storage based upon communications between the work machine and the transport vehicle and comprising an identifier associated with the transport vehicle.

15. A system for real-time deduction of material carryback in a loading container of a transport vehicle, wherein the material is loaded in the loading container by a work machine at a first site and dumped from the loading container by the transport vehicle at a second site, the system comprising:
    a first sensor associated with one of the work machine or the transport vehicle and configured to provide first data corresponding to a volume of material loaded in the loading container in a first work state;
    a second sensor associated with the other of the work machine or the transport vehicle and configured to provide second data corresponding to a volume of material loaded in the loading container in a second work state; and
    a computing device comprising a computer-readable medium residing on one of the work machine or the transport vehicle and having program instructions residing thereon, said program instructions executable by a processor to generate an output signal corresponding to a calculated total volume of material associated with a work cycle, said total volume based at least in part on the provided first data and the provided second data.

16. The system of claim 15, wherein the computing device is configured to:
   determine a first volume based at least in part on the provided first data and information regarding one or more dimensions of the loading container;
   determine a second volume based at least in part on the provided second data and the information regarding one or more dimensions of the loading container; and
   calculate the total volume of material associated with the work cycle based on a difference between the determined first and second volumes.

17. The system of claim 15, wherein:
   the first sensor comprises a first image data source configured to generate signals corresponding to a first profile of material loaded in the loading container in the first work state;
   the second sensor comprises a second image data source configured to generate signals corresponding to a second profile of material loaded in the loading container in the second work state; and
   the total volume is calculated based at least in part on a determined first profile and a determined second profile of loaded material.

18. The system of claim 17, wherein information regarding one or more dimensions of the loading container is obtained via scanned images from the first image data source and/or the second image data source.

19. The system of claim 17, wherein the information regarding one or more dimensions of the loading container is retrieved from data storage based upon scanned images comprising an identifier associated with the transport vehicle and/or based upon communications between the work machine and the transport vehicle and comprising an identifier associated with the transport vehicle.

20. The system of claim 15, wherein:
   the first sensor comprises an image data source associated with the work machine and configured to generate signals corresponding to a profile of material loaded in the loading container in the first work state;
   the second sensor comprises a payload measuring unit associated with the transport vehicle; and
   the computing device is configured to:
      determine a material density of material loaded in the transport vehicle based on input from the first sensor in the first work state and on input from the payload measuring unit in the first work state; and
      determine a volume of material remaining in the transport vehicle in the second work state based on input from the payload measuring unit in the second work state and further in view of the determined material density.

* * * * *